United States Patent
Bischoff et al.

(10) Patent No.: US 9,479,618 B2
(45) Date of Patent: Oct. 25, 2016

(54) MECHANISM FOR HANDLING USER INPUT LOSS THAT OCCURS DURING TRANSMISSION FROM A CLIENT DEVICE TO A REMOTE SERVER USING RING BUFFER MESSAGES IN CONJUNCTION WITH UDP

(71) Applicant: GOOGLE INC., Mountain View, CA (US)

(72) Inventors: Justin Paul Bischoff, Mountain View, CA (US); Devendra Raut, Cupertino, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 14/225,333

(22) Filed: Mar. 25, 2014

(65) Prior Publication Data

US 2015/0281328 A1    Oct. 1, 2015

(51) Int. Cl.
| | |
|---|---|
| *G06F 15/16* | (2006.01) |
| *G06F 11/00* | (2006.01) |
| *G01S 19/42* | (2010.01) |
| *G06F 13/42* | (2006.01) |
| *H04L 1/18* | (2006.01) |
| *H04L 29/06* | (2006.01) |
| *A63F 13/30* | (2014.01) |

(52) U.S. Cl.
CPC ............. *H04L 69/164* (2013.01); *A63F 13/30* (2014.09); *H04L 67/38* (2013.01); *A63F 2300/534* (2013.01); *A63F 2300/535* (2013.01)

(58) Field of Classification Search
CPC .... H04L 47/00; H04L 1/1877; H04L 1/1887
USPC ........................................................ 709/203
See application file for complete search history.

(56) References Cited

U.S. PATENT DOCUMENTS

| | | | | |
|---|---|---|---|---|
| 2006/0129723 | A1* | 6/2006 | Green | ................... H04L 1/1877 710/106 |
| 2006/0179392 | A1* | 8/2006 | Ota | ........................ H04L 1/1809 714/749 |
| 2012/0069036 | A1 | 3/2012 | Dharmapurikar | |
| 2013/0016009 | A1* | 1/2013 | Godfrey | .................. G01S 19/34 342/357.31 |
| 2013/0016107 | A1 | 1/2013 | Dharmapurikar | |
| 2013/0147819 | A1 | 6/2013 | Dharmapurikar | |
| 2013/0198794 | A1 | 8/2013 | Dharmapurikar | |
| 2013/0268807 | A1* | 10/2013 | Spencer | .............. G06F 11/1412 714/18 |

OTHER PUBLICATIONS

BlackWasp Article for a Generic Circular Buffer on the Internet at URL: www.blackwasp.co.uk/CircularBuffer.aspx, pp. 1-6, dated Nov. 7, 2011.*

* cited by examiner

*Primary Examiner* — Tonia L Dollinger
*Assistant Examiner* — Kishin G Belani
(74) *Attorney, Agent, or Firm* — Brake Hughes Bellermann LLP

(57) ABSTRACT

A method for handling user input loss from a client device to a remote server using user datagram protocol (UDP), includes receiving a newly generated user input command at the client device, removing a previously generated user input command located at a front of the ring buffer from the ring buffer, shifting one or more other previously generated user input commands towards the front of the ring buffer, placing the newly generated user input command at an end of a ring buffer, and sending a first ring buffer message containing the one or more other previously generated input commands and the newly generated user input command to the remote server.

20 Claims, 7 Drawing Sheets

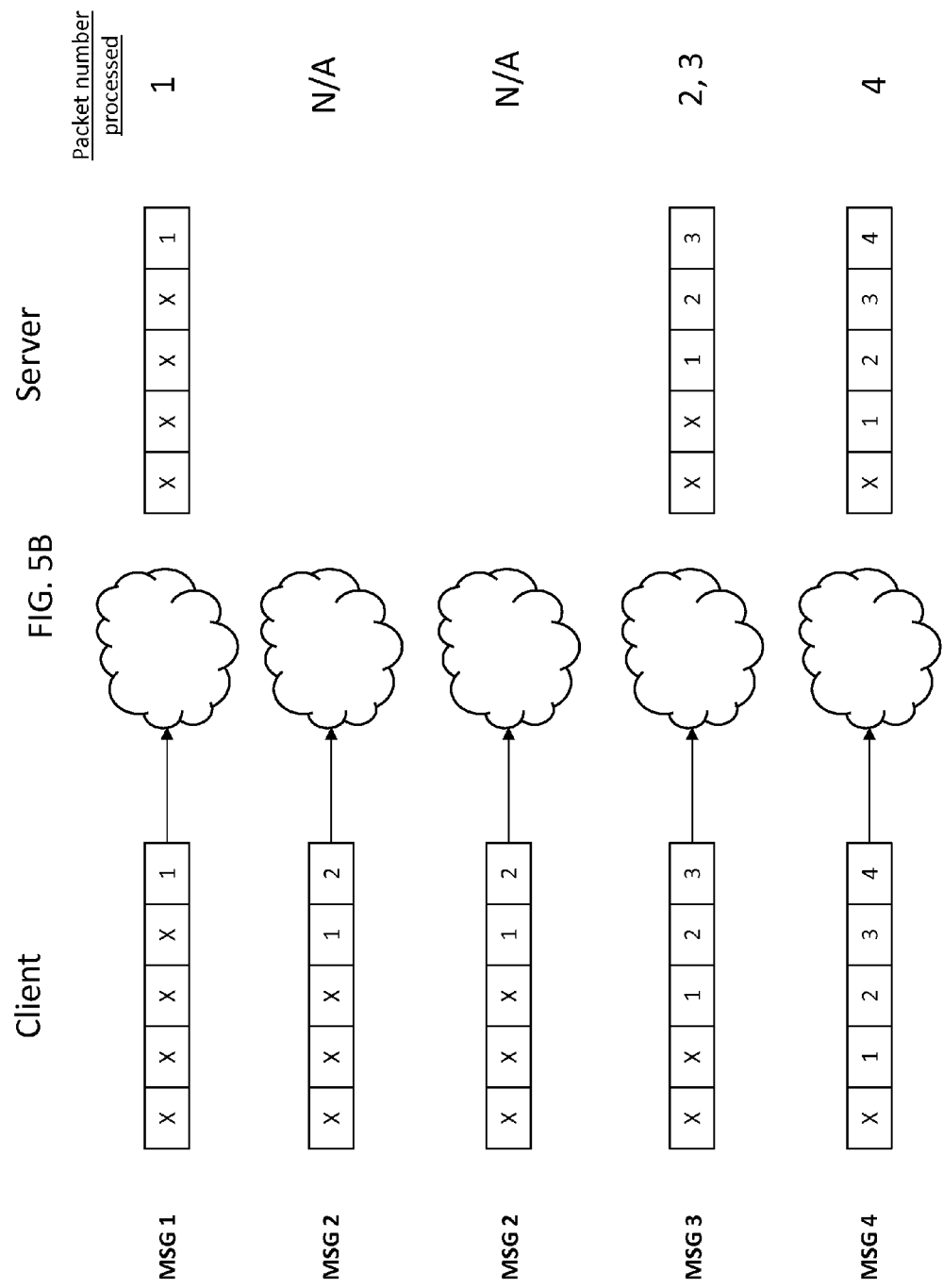

MECHANISM FOR HANDLING USER INPUT LOSS THAT OCCURS DURING TRANSMISSION FROM A CLIENT DEVICE TO A REMOTE SERVER USING RING BUFFER MESSAGES IN CONJUNCTION WITH UDP

FIELD OF THE INVENTION

This invention relates to the field of remote content delivery, and in particular to a mechanism for handling user input loss that occurs during transmission from a client device to a remote server using ring buffer messages in conjunction with User Datagram Protocol (UDP).

BACKGROUND

Remote content delivery is a mechanism often used in the context of gaming to allow a user operating a client device to interact with content being generated remotely. For example, a user may be operating a client device that interacts with a game running on a remote server. User inputs may be transmitted from the client device to the remote server, where content in the form of game instructions or graphics may be generated for transmission back to the client device. Such remote interaction between users and games may occur during actual gameplay as well as during game menu interfacing.

Typically user inputs are sent individually over a network from the client device to the remote server as a packet using a transmission control protocol (TCP). In order to ensure that loss of user inputs doesn't occur, whenever a user input is lost during transmission, the remote server notifies the client device and requests the client device to retransmit the lost user input. Until the remote server receives the lost user input, any other subsequent user inputs that are generated at the client device are blocked from being transmitted to the remote server. While user input loss is eliminated under such a mechanism, undesirable behavior may occur due to the latency involved in handling user input loss. For example, if user inputs are not immediately transmitted to the remote server due to network loss, and are all of a sudden received when network conditions improve, then graphics corresponding to those user inputs may be displayed in an unusual manner (e.g., displayed in a bursty nature) at the client device.

Because gaming typically requires very quick response time between transmission of user inputs and generating game content in response to user inputs, the undesirable behaviors resulting from handling packet loss using TCP may be intolerable.

SUMMARY

According to some embodiments, a mechanism for handling user input loss that occurs during transmission from a client device to a remote server using ring buffer messages in conjunction with User Datagram Protocol (UDP) is described.

Further details of aspects, objects and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 5A and 5B illustrate different examples of handling user input loss that occurs during transmission from a client device to a remote server using a ring buffer message in conjunction with UDP.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment or embodiments.

According to some embodiments, a mechanism for handling user input loss that occurs during transmission from a client device to a remote server using ring buffer messages in conjunction with User Datagram Protocol (UDP) is described.

Figure 1:
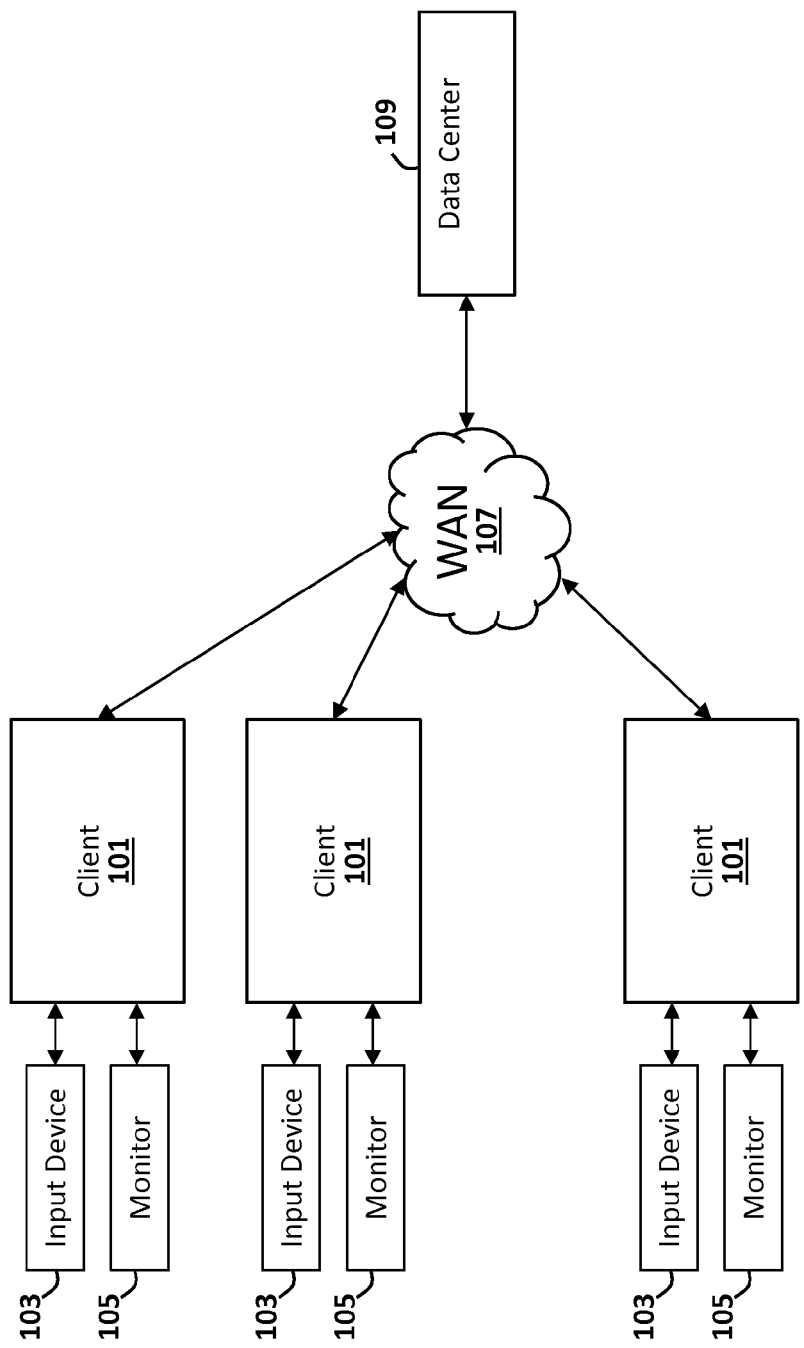
FIG. 1 illustrates an example system for remote content delivery.

Remote content delivery is a mechanism often used in the context of gaming to allow a user operating a client device to interact with content being generated remotely. FIG. 1 illustrates an example system 100 for remote content delivery. In the system 100 illustrated in FIG. 1, several client devices 101 interact with a remote server (e.g., data center) 109 over a network 107, such as a wide area network (WAN). The remote server 109 and client devices 101 may all be located in different geographical locations, and each client device 101 may interact with a different game program running at the remote server (e.g., data center) 109.

The client device 101 may be a set-top box (STB), mobile phone, thin gaming console, or any other type of device capable of communicating with the remote server 109. Each client device 101 may be associated with an input device 103 and a monitor 105. Such input devices may include keyboards, joysticks, game controllers, motion sensors, touchpads, etc. A client device 101 interacts with a game program running at the remove server 109 by sending inputs to the remote server 109 using its respective input device 103. Such interaction between users and games may occur during actual gameplay as well as during game menu interfacing.

Each game program is configured to interpret and respond to such input signals. User inputs may be transmitted from the client device 101 to the remote server 109, where content is generated for transmission back to the client device 101. The remote server 109 interprets the user input and generates content to be delivered to the client device 101 in response to the user inputs. Such content may take the form of game instructions for the client device 101 or rendered graphics for the client device 101. The generated content is then transmitted to the client device 101 where it is processed for display on the monitor 105.

Various mechanisms for remote content generation and delivery are available. Some approaches for implementing remote content generation and delivery in conjunction with the present invention are described in U.S. application Ser. No. 13/234,948; U.S. application Ser. No. 13/349,422; co-pending U.S. application Ser. No. 13/491,930; and U.S. application Ser. No. 13/558,163, which are hereby incorporated by reference in their entirety.

Typically user inputs are sent individually over a network from the client device to the remote server as a packet using a transmission control protocol (TCP). In order to ensure that user input loss doesn't occur, whenever a user input is lost during transmission, the remote server notifies the client device and requests the client device to retransmit the lost user input. Until the remote server receives the lost user input, any other subsequent user inputs that are generated at the client device are blocked from being transmitted to the remote server. While user input loss is eliminated under such a mechanism, undesirable behavior may occur due to the latency involved in handling user input loss. For example, if user inputs are not immediately transmitted to the remote server due to network loss, and are all of a sudden received when network conditions improve, then graphics corresponding to those user inputs may be displayed in an unusual manner (e.g., displayed in a bursty nature) at the client device.

Figure 2:
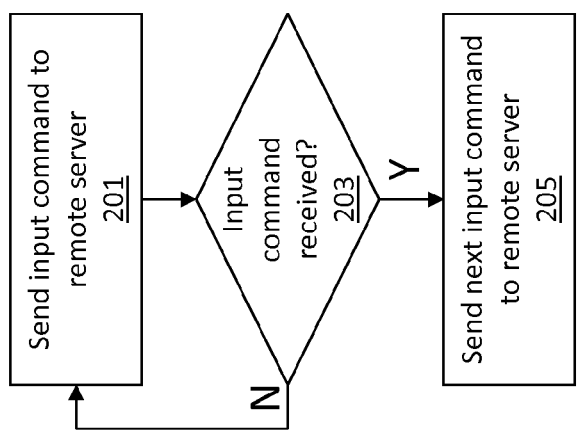
FIG. 2 is a flow diagram illustrating a conventional mechanism for handling user input loss that occurs during transmission from a client device to a remote server under a TCP protocol.

FIG. 2 is a flow diagram illustrating a conventional mechanism for handling user input loss that occurs during transmission from a client device to a remote server under a TCP protocol. Initially an input command is sent from the client device to the remote server as shown at 201. The input command is sent individually.

After sending the input command, the client device checks to see if the input command is received at the remote server as shown at 203. If the user input is received at the remote server, the client device will receive a notification indicating that the user input has been received, otherwise the client device will receive a notification indicating that the user input has been lost during transmission.

If the client device determines that the input command was received at the remote server, the client device may transmit the next input command to the remote server as shown at 205. If, the client device instead determines that the input command was lost during transmission, then the client device will return to 201 where it will resend the lost input command to the remote server.

Because subsequent user input commands cannot be sent until a preceding user input command is received at the remote server, undesirable behavior may occur whenever an input command is lost during transmission. Such behavior may include graphics corresponding to user inputs being displayed in a bursty nature. For example, where a user of the client device is attempting to maneuver an object being displayed using a set of input commands, and one of those input commands becomes lost during transmission, then the object may remain still until the lost input command is received, and then move in an erratic nature corresponding to the subsequent input commands being received and processed. Gaming typically requires very quick response time between transmission of user inputs and generating game content in response to user inputs, and so the undesirable behaviors resulting from handling user input loss using TCP may be intolerable.

In order to overcome the undesirable behavior caused by handling user input loss using TCP, a user datagram protocol (UDP) may be used in conjunction with a ring buffer message for handling user input loss. By using UDP instead of TCP, each time an input command is generated by the client device, a ring buffer message containing the last N input commands are sent to the remote server rather than a single input command being sent at a time. Even though some ring buffer messages having the generated input command may be lost during transmission, subsequent ring buffer messages including the generated input command may still be received by the remote server, such that the generated input command may be recovered. Additionally, even if no user input is occurring, a threshold period of time is set for periodically resending the last ring buffer message to protect against the possibility of the any user inputs in the last ring buffer message being lost.

Figure 3:
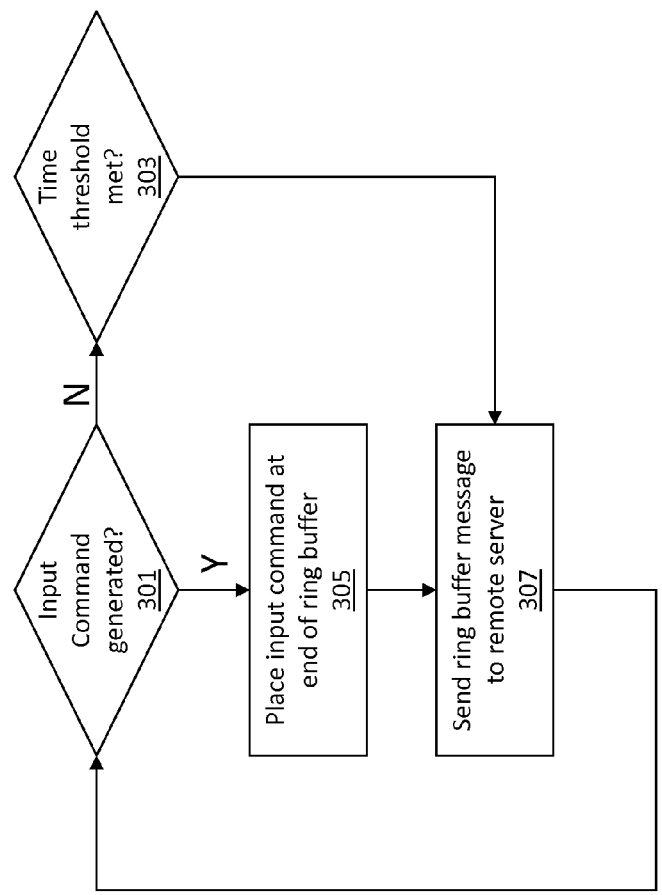
FIG. 3 is a flow diagram illustrating a method for handling user input loss that occurs during transmission from a client device to a remote server using a ring buffer message in conjunction with UDP in accordance with some embodiments of the invention.

FIG. 3 is a flow diagram illustrating a method for handling user input loss that occurs during transmission from a client device to a remote server using a ring buffer message in conjunction with UDP in accordance with some embodiments of the invention. FIG. 3 is described from the perspective of the client device.

Initially, a determination is made as to whether a user input command has been generated as shown at 301. The user input command may include a keyboard stroke, mouse movement, directional pad movement, joystick movement, or any other input device movement that results in a change in graphics being displayed at the client device.

When a user input command is generated, the user input command is placed at the end of the ring buffer as shown at 305. The user input command is placed at the end of the ring buffer with a sequence identifier indicating its relative sequence order. In some embodiments, the sequence identifier may be a timestamp or sequence number. In other embodiments, the sequence identifier may be any identifier that allows for a remote server to identify its sequence order. The remote server may process the user input command in order based on its sequence identifier, which will be described in additional detail below.

When the user input command is placed at the end of the ring buffer, the user input command previously at the front of the ring buffer is removed from the buffer, and all other input commands in the ring buffer are shifted towards the front of the ring buffer. For example, if the ring buffer has 3 storage locations then the input command located at the first storage location is removed, the input command located at the second storage location is shifted to the first storage location, the input command located at the third storage location is shifted to the second storage location and the generated input command is placed in the third storage location.

Alternatively, rather than physically shifting an input command from one storage location to another storage location, the input commands may be logically shifted within the ring buffer. Input commands may remain in their data storage locations and a pointer directed at the storage location corresponding to the front of the ring buffer may be shifted one data storage location in a direction towards the end of the ring buffer, such that the pointer now points to another storage location as the front of the ring buffer. The most recently generated input command may replace the input command previously located at the front of the ring buffer, and a pointer corresponding to the end of the ring buffer may be directed at the storage location where the most recently generated input command is placed. Thus input commands are logically moved in the ring buffer rather than physically shifted in the ring buffer.

After the generated user input command is placed at the end of the ring buffer, a ring buffer message, containing all of the input commands currently in the ring buffer is sent to the remote server as shown at 307. Thereafter, the method returns to 301, where another determination is made as to whether an input command has been generated.

If a user input command has not yet been generated, a determination is made as to whether a threshold period of time has been met as shown at 303. The threshold period of time may be set to a value that minimizes the latency of content being displayed at the client device. If the threshold period of time has been met and no new input commands have been generated, then another ring buffer message containing all of the input commands currently in the ring buffer is sent as shown at 307.

The ring buffer may have any N storage locations. An input command that is initially placed at the end of the ring buffer will have at least N chances to be recovered by the remote server. Said otherwise, even where the initial ring buffer message containing the input command is lost, so long as N−1 or less ring buffer messages subsequent to the initial ring buffer message are lost, the input command may be recovered by the remote server.

For example, consider a ring buffer having 3 storage locations, currently including an input command having a sequence identifier of 1 in the first storage location, an input command having a sequence identifier of 2 in the second storage location and an input command having a sequence identifier of 3 in the third storage location. If the ring buffer message containing the input command having a sequence identifier of 3 in the third storage location is lost during transmission, the remote server may recover the input command having a sequence of identifier of 3 in any of the 2 subsequent ring buffer messages. The remote server may recover the input command having a sequence of identifier of 3 in a subsequent ring buffer message where the input command is located in the second storage location or the first storage location.

Even where more than N−1 ring buffer messages subsequent to the initial ring buffer message are lost, if some of those subsequent ring buffer messages are re-transmissions based on time threshold rather than ring buffer messages containing a new set of input commands then the remote server will have more than N−1 opportunities to recover the input command.

By sending input commands as ring buffer messages rather than individual user input s, input commands generated subsequent to an input command that is lost during transmission need not wait until the lost input command is resolved before being sent. Latency is minimized because subsequent ring buffer messages may be sent even where a preceding ring buffer message was lost. Moreover, by optimally setting the ring buffer size, an input command will have ample opportunity to be recovered by the remote server even where some of the ring buffer messages containing the input command are lost.

Figure 4:
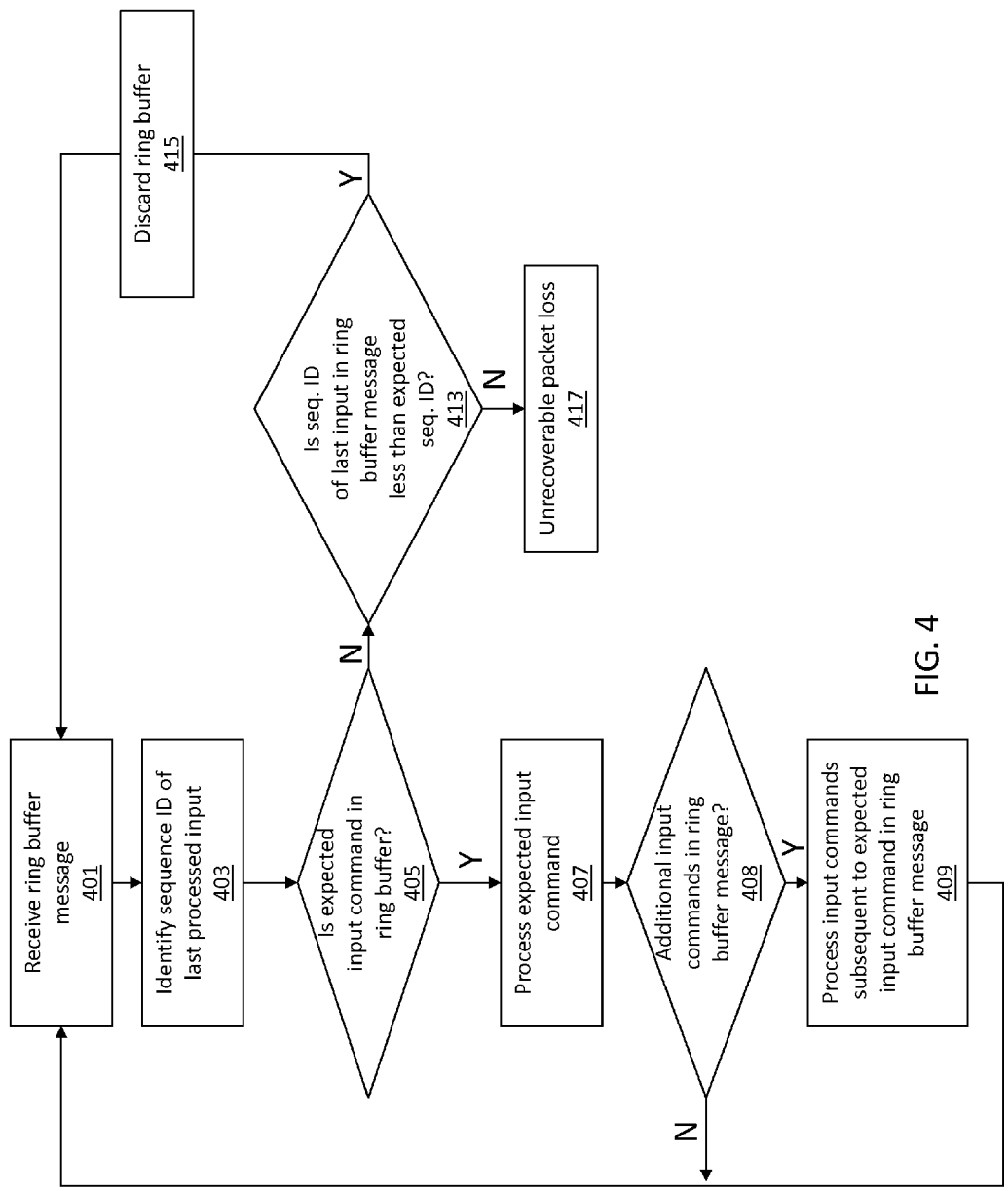
FIG. 4 is a flow diagram illustrating a method for handling user input loss that occurs during transmission from a client device to a remote server using a ring buffer message in conjunction with UDP in accordance with some embodiments of the invention.

FIG. 4 is a flow diagram illustrating a method for handling user input loss that occurs during transmission from a client device to a remote server using a ring buffer message in conjunction with UDP in accordance with some embodiments of the invention. FIG. 4 is described from the perspective of the remote server.

Initially, the remote server receives a ring buffer message that includes a set of input commands having sequence identifiers as shown at 401. The remote server then identifies the sequence identifier of the last input command processed as shown at 403 and makes a determination as to whether the received ring buffer message contains an input command having the next expected sequence identifier as shown at 405.

Each time an input command is processed at the remote server, an indication of the sequence identifier for that input command is saved at the remote server and used by the remote server to identify the next expected sequence identifier when processing input commands. Whenever a ring buffer message is received at the remote server, the remote server identifies the next expected sequence identifier based on the sequence identifier of the previously processed input command.

If the received ring buffer message includes the input command having the next expected sequence identifier, then the remote server processes the input command with the expected sequence identifier as shown at 407. In some situations, the received ring buffer message is the ring buffer message immediately subsequent to the ring buffer message containing the previously processed input command. In such situations, the only input command in the received ring buffer message that wasn't already previously processed is the input command having the next expected sequence identifier.

In other situations, the received ring buffer message may include one or more input commands having sequence identifiers subsequent to the expected sequence identifier in addition to the input command having the expected sequence identifier. This is because at least some of the ring buffer messages immediately subsequent to the ring buffer message containing the previously processed input command were lost during transmission.

Thus, after processing the input command having the next expected sequence identifier, the remote server makes a determination as to whether any input commands having sequence identifiers subsequent to the expected sequence identifier are contained in the received ring buffer message as shown at 408. If there are no input commands having sequence identifiers subsequent to the expected sequence identifier in the received ring buffer message, then the method returns to 401 where the remote server waits to receive another ring buffer message.

If there are input commands having sequence identifiers subsequent to the expected sequence identifier in the received ring buffer message, then the remote server will also process those input commands as shown at 409 before returning to 401 to wait to receive another ring buffer message.

If the received ring buffer message does not include the input command having the next expected sequence identifier, then the remote server determines whether the sequence identifier of the input command at the end of the ring buffer message is less than the expected sequence identifier as shown at 413. If the sequence identifier of the input command at the end of the ring buffer message is less than the expected sequence identifier, then the ring buffer message has been sent out of order and the ring buffer message is discarded as shown at 415. The remote server then returns to 401 to wait for another ring buffer message.

If the sequence identifier of the input command at the end of the ring buffer message is greater than the expected sequence identifier and an input command having the expected sequence identifier is not in the ring buffer message, then the input command having the expected sequence identifier was lost during transmission as shown at 417. The input command having the expected sequence identifier may have been lost because the network was down during the period of time that ring buffer messages containing the input command having the expected sequence identifier were being sent from the client device.

However, by setting the size of the ring buffer message based on expected behavior patterns of the network being utilized to facilitate communication between the client device and remote server, the chance of an input command being lost may be minimized.

As mentioned above, by sending input commands as ring buffer messages rather than individual user inputs, input commands generated subsequent to an input command that is lost during transmission need not wait until the lost input command is resolved before being sent. Latency is minimized because subsequent ring buffer messages may be sent even where a preceding ring buffer message was lost. Moreover, by optimally setting the ring buffer size, an input command will have ample opportunity to be recovered by the remote server even where some of the ring buffer messages containing the input command are lost.

Figure 5A:
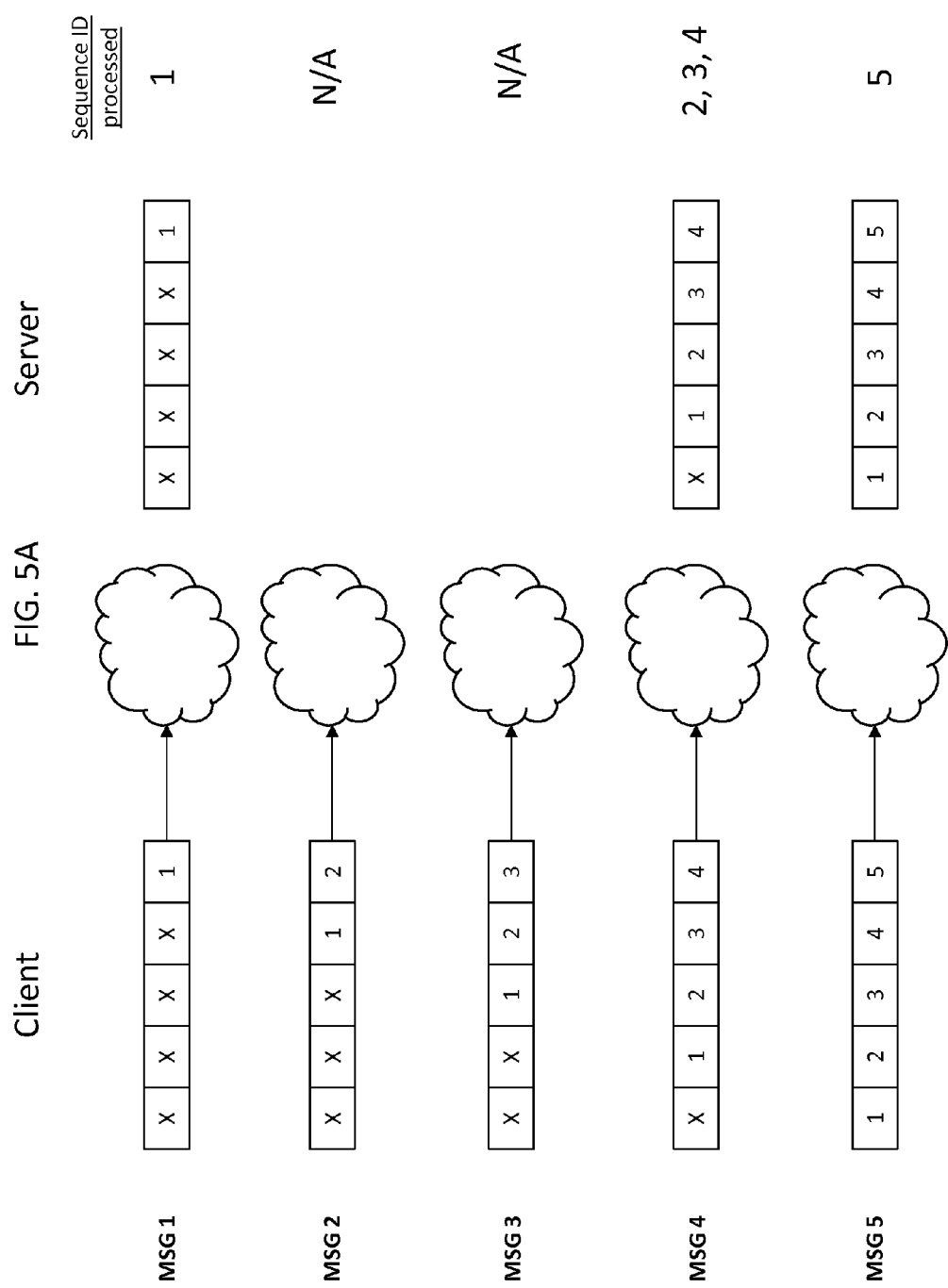

FIGS. 5A and 5B illustrate different examples of handling user input loss that occurs during transmission from a client device to a remote server using a ring buffer message in conjunction with UDP. The ring buffer messages illustrated in FIGS. 5A to 5B have 5 storage locations with the front of the ring buffer message located on the left and the end of the ring buffer message located on the right.

FIG. 5A illustrates an example of recovering an input command with an expected sequence identifier where one or more ring buffer messages having the input command with the expected sequence identifier is lost.

In FIG. 5A, a first ring buffer message is transmitted to the remote server. The first ring buffer message includes an input command having a sequence identifier of 1 in its last data storage location and no other input commands in its other storage locations. The first ring buffer message is transmitted to the remote server without being lost. The remote server identifies that the expected sequence identifier is 1 upon receipt of the first ring buffer message because no other input commands have been previously processed. The remote server locates the input command having a sequence identifier of 1 and processes the input command having a sequence identifier of 1. The remote server then makes a determination as to whether any input commands having sequence identifiers subsequent to the expected sequence identifier of 1 are contained in the first ring buffer message. Here, no input commands having sequence identifiers subsequent to the expected sequence identifier of 1 are contained in the first ring buffer message and so the remote server waits to receive another ring buffer message.

After the first ring buffer message is transmitted, the client device generates another input command having a sequence identifier of 2. The generated input command is placed at the end of the ring buffer and the all other input commands in the ring buffer are shifted one location towards the front. A second ring buffer message that includes the newly generated input command is then transmitted to the remote server. The second ring buffer message includes an input command having a sequence identifier of 1 in its 4th data storage location, an input command having a sequence identifier of 2 in its last data storage location, and no other input commands in its other storage locations. The second ring buffer message is lost before the remote server receives the second ring buffer message.

After the second ring buffer message is transmitted, the client device generates another input command having a sequence identifier of 3. The generated input command is placed at the end of the ring buffer and the all other input commands in the ring buffer are shifted one location towards the front. A third ring buffer message that includes the newly generated input command is then transmitted to the remote server, even though the second ring buffer message was never received at the remote server. The third ring buffer message includes an input command having a sequence identifier of 1 in its 3rd data storage location, an input command having a sequence identifier of 2 in its 4th data storage location, an input command having a sequence identifier of 3 in its last data storage location and no other input commands in its other storage locations. As illustrated in FIG. 5A, the third ring buffer message is lost before the remote server receives the third ring buffer message.

After the third ring buffer message is transmitted, the client device generates another input command having a sequence identifier of 4. The generated input command is placed at the end of the ring buffer and the all other input commands in the ring buffer are shifted one location towards the front. A fourth ring buffer message that includes the newly generated input command is then transmitted to the remote server, even though the second ring buffer message was never received at the remote server. The fourth ring buffer message includes an input command having a sequence identifier of 1 in its 2nd data storage location, an input command having a sequence identifier of 2 in its 3rd data storage location, an input command having a sequence identifier of 3 in its 4th data storage location, an input command having a sequence identifier of 4 in its last storage location, and no other input commands in its other storage locations. As illustrated in FIG. 5A, the fourth ring buffer message is received at the remote server.

The remote server identifies that the expected sequence identifier is 2 upon receipt of the fourth ring buffer message because an input command having a sequence identifier of 1 was previously processed. The remote server locates the input command having a sequence identifier of 2 in the $3^{rd}$ storage location and processes the input command having a sequence identifier of 2. The remote server then makes a determination as to whether any input commands having sequence identifiers subsequent to the expected sequence identifier of 2 are contained in the fourth ring buffer message. Here, input commands having sequence identifiers of 3 and 4 are contained in the fourth ring buffer message and so the remote server processes the input commands having sequence identifiers of 3 and 4 and waits to receive another ring buffer message.

After the fourth ring buffer message is transmitted, the client device generates another input command having a sequence identifier of 5. The generated input command is placed at the end of the ring buffer and the all other input commands in the ring buffer are shifted one location towards the front. A fifth ring buffer message that includes the newly generated input command is then transmitted to the remote server. The fifth ring buffer message includes an input command having a sequence identifier of 1 in its $1^{st}$ data storage location, an input command having a sequence identifier of 2 in its 2nd data storage location, an input command having a sequence identifier of 3 in its 3rd data storage location, an input command having a sequence identifier of 4 in its 4th data storage location, and an input command having a sequence identifier of 5 in its last storage location. As illustrated in FIG. 5A, the fifth ring buffer message is received at the remote server.

The remote server identifies that the expected sequence identifier is 5 upon receipt of the fourth ring buffer message because an input command having a sequence identifier of 4 was previously processed. The remote server locates the input command having a sequence identifier of 5 in the last storage location and processes the input command having a sequence identifier of 5. The remote server then makes a determination as to whether any input commands having sequence identifiers subsequent to the expected sequence identifier of 5 are contained in the fourth ring buffer message. Here, no input commands having sequence identifiers subsequent to the expected sequence identifier of 5 are contained in the fifth ring buffer message and so the remote server processes the input command having a sequence identifier of 5 and waits to receive another ring buffer message.

FIG. 5A clearly illustrates that by sending input commands as ring buffer messages rather than individual user inputs, input commands generated subsequent to an input command that is lost during transmission need not wait until the lost input command is resolved before being sent. Latency is minimized because subsequent ring buffer messages may be sent even where a preceding ring buffer message was lost. Moreover, by optimally setting the ring buffer size, an input command will have ample opportunity to be recovered by the remote server even where some of the ring buffer messages containing the input command are lost.

FIG. 5B illustrates another example of recovering an input command with an expected sequence identifier where one or more ring buffer messages having the input command with the expected sequence identifier is lost.

In FIG. 5B, a first ring buffer message is transmitted to the remote server. The first ring buffer message includes an input command having a sequence identifier of 1 in its last data storage location and no other input commands in its other storage locations. The first ring buffer message is transmitted to the remote server without being lost. The remote server identifies that the expected sequence identifier is 1 upon receipt of the first ring buffer message because no other input commands have been previously processed. The remote server locates the input command having a sequence identifier of 1 and processes the input command having a sequence identifier of 1. The remote server then makes a determination as to whether any input commands having sequence identifiers subsequent to the expected sequence identifier of 1 are contained in the first ring buffer message. Here, no input commands having sequence identifiers subsequent to the expected sequence identifier of 1 are contained in the first ring buffer message and so the remote server waits to receive another ring buffer message.

After the first ring buffer message is transmitted, the client device generates another input command having a sequence identifier of 2. The generated input command is placed at the end of the ring buffer and the all other input commands in the ring buffer are shifted one location towards the front. A second ring buffer message that includes the newly generated input command is then transmitted to the remote server. The second ring buffer message includes an input command having a sequence identifier of 1 in its 4th data storage location, an input command having a sequence identifier of 2 in its last data storage location, and no other input commands in its other storage locations. The second ring buffer message is lost before the remote server receives the second ring buffer message.

After the second ring buffer message is transmitted, a threshold period of time elapses where no new input commands are generated. Because the threshold period of time has elapsed, the client device resends the second ring buffer message. The resent second ring buffer message is lost before the remote server receives the resent second ring buffer message.

After resending the second ring buffer message, the client device generates another input command having a sequence identifier of 3. The generated input command is placed at the end of the ring buffer and the all other input commands in the ring buffer are shifted one location towards the front. A third ring buffer message that includes the newly generated input command is then transmitted to the remote server, even though the second ring buffer message was never received at the remote server. The third ring buffer message includes an input command having a sequence identifier of 1 in its 3rd data storage location, an input command having a sequence identifier of 2 in its 4th data storage location, an input command having a sequence identifier of 3 in its last data storage location and no other input commands in its other storage locations. As illustrated in FIG. 5B, the third ring buffer message is received at the remote server.

The remote server identifies that the expected sequence identifier is 2 upon receipt of the third ring buffer message because an input command having a sequence identifier of 1 was previously processed. The remote server locates the input command having a sequence identifier of 2 in the $4^{th}$ storage location and processes the input command having a sequence identifier of 2. The remote server then makes a determination as to whether any input commands having sequence identifiers subsequent to the expected sequence identifier of 2 are contained in the third ring buffer message. Here, an input command having a sequence identifier of 3 is contained in the third ring buffer message and so the remote server processes the input command having a sequence identifier of 3 and waits to receive another ring buffer message.

After the third ring buffer message is transmitted, the client device generates another input command having a sequence identifier of 4. The generated input command is placed at the end of the ring buffer and the all other input commands in the ring buffer are shifted one location towards the front. A fourth ring buffer message that includes the newly generated input command is then transmitted to the remote server, even though the second ring buffer message was never received at the remote server. The fourth ring buffer message includes an input command having a sequence identifier of 1 in its 2nd data storage location, an input command having a sequence identifier of 2 in its 3rd data storage location, an input command having a sequence identifier of 3 in its 4th data storage location, an input command having a sequence identifier of 4 in its last storage location, and no other input commands in its other storage locations. As illustrated in FIG. 5B, the fourth ring buffer message is received at the remote server.

The remote server identifies that the expected sequence identifier is 4 upon receipt of the fourth ring buffer message because an input command having a sequence identifier of 3 was previously processed. The remote server locates the input command having a sequence identifier of 4 in the last storage location and processes the input command having a sequence identifier of 4. The remote server then makes a determination as to whether any input commands having sequence identifiers subsequent to the expected sequence identifier of 4 are contained in the fourth ring buffer message. Here, no input commands having a sequence identifier subsequent to 4 are contained in the fourth ring buffer message and so the remote server waits to receive another ring buffer message.

Much like the example in FIG. 5A, FIG. 5B clearly illustrates that by sending input commands as ring buffer messages rather than individual user inputs, input commands generated subsequent to an input command that is lost during transmission need not wait until the lost input command is resolved before being sent. Latency is minimized because subsequent ring buffer messages may be sent even where a preceding ring buffer message was lost. Moreover, by optimally setting the ring buffer size, an input command will have ample opportunity to be recovered by the remote server even where some of the ring buffer messages containing the input command are lost.

System Architecture

Figure 6:
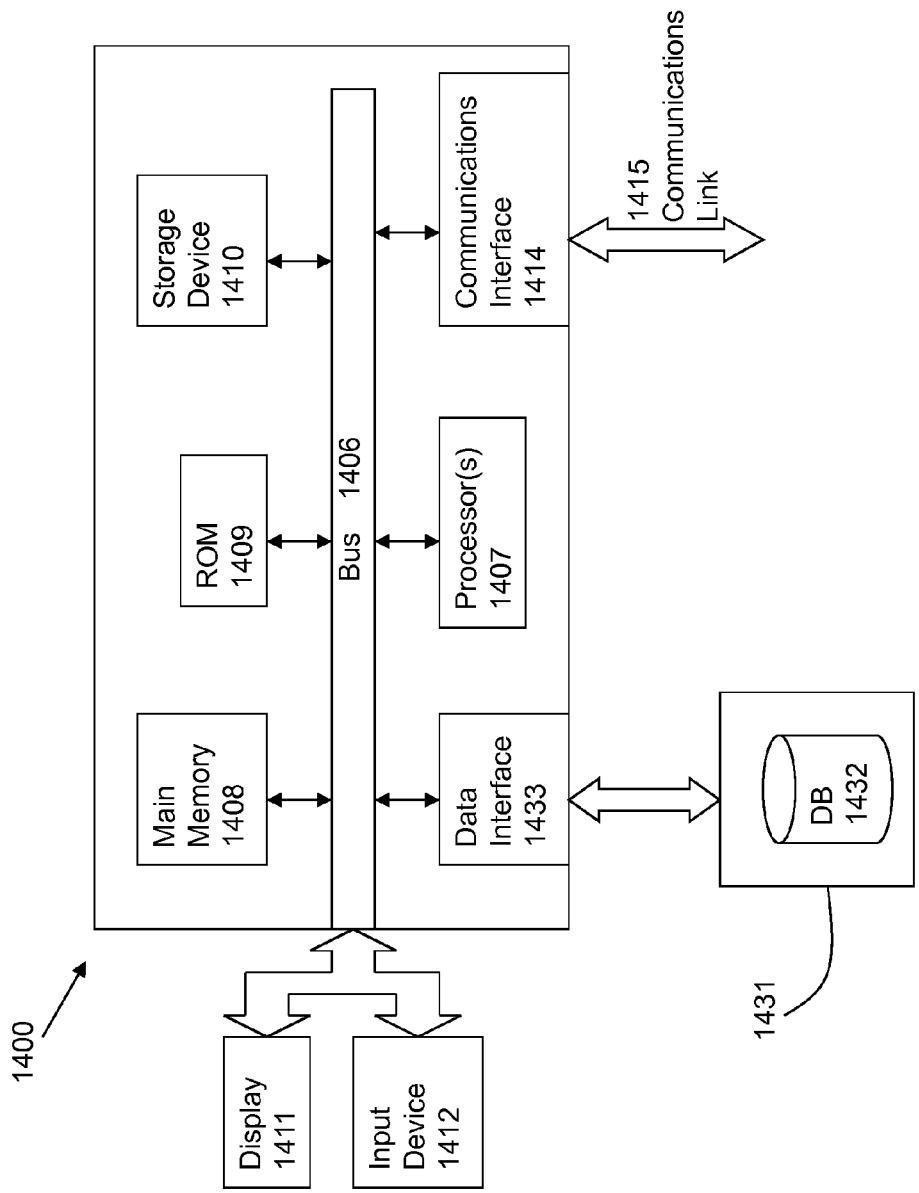
FIG. 6 is a block diagram of an illustrative computing system suitable for implementing an embodiment of the present invention

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for handling user input loss from a client device to a remote server using user datagram protocol (UDP), comprising:
   receiving a newly generated user input command at the client device; and
   in response to receiving the newly generated user input command:
      removing a previously generated user input command located at a front of a ring buffer of the client device from the ring buffer;
      shifting one or more other previously generated user input commands located in the ring buffer towards the front of the ring buffer;
      placing the newly generated user input command at an end of the ring buffer; and
      sending, using UDP, a first ring buffer message containing the one or more other previously generated user input commands and the newly generated user input command to the remote server.

2. The method of claim 1, wherein shifting the one or more other previously generated user input commands comprises logically shifting the one or more other previously generated user input commands.

3. The method of claim 1, wherein placing the newly generated user input command at the end of the ring buffer comprises logically placing the newly generated user input command at the end of the ring buffer.

4. The method of claim 1, wherein the first ring buffer message is resent to the remote server if another newly generated user input command is not received at the client device within a threshold period of time.

5. The method of claim 4, wherein the threshold period of time is set to a value that minimizes a latency of content being displayed at the client device in correspondence to the newly generated user input command.

6. The method of claim 1, wherein the ring buffer is updated with another newly generated user input command that is placed at the end of the ring buffer and, in response to receiving the another newly generated user input command, a second ring buffer message corresponding to the updated ring buffer is sent to the remote server.

7. The method of claim 6, wherein the second ring buffer message is sent to the remote server regardless of whether or not the first ring buffer message is received at the remote server.

8. The method of claim 1, wherein the ring buffer has a size of N storage locations.

9. The method of claim 8, wherein the newly generated user input command placed at the end of the ring buffer will have at least N chances to be recovered at the remote server.

10. The method of claim 1, wherein the newly generated user input command and the one or more other previously generated user input commands each have a sequence identifier indicating a sequence order.

11. A computer program product embodied on a non-transitory computer readable medium, the non-transitory computer readable medium having stored thereon a sequence of instructions which, when executed by a processor causes the processor to execute a method for handling user input loss from a client device to a remote server using user datagram protocol (UDP), comprising:
    receiving a newly generated user input command at the client device;
    in response to receiving the newly generated user input command:
        removing a previously generated user input command located at a front of a ring buffer of the client device from the ring buffer;
        shifting one or more other previously generated user input commands located in the ring buffer towards the front of the ring buffer;
        placing the newly generated user input command at an end of the ring buffer; and
        sending, using UDP, a first ring buffer message containing the one or more other previously generated user input commands and the newly generated user input command to the remote server.

12. The computer program product of claim 11, wherein shifting the one or more other previously generated user input commands comprises logically shifting the one or more other previously generated user input commands.

13. The computer program product of claim 11, wherein placing the newly generated user input command at the end of the ring buffer comprises logically placing the newly generated user input command at the end of the ring buffer.

14. The computer program product of claim 11, wherein the first ring buffer message is resent to the remote server if another newly generated user input command is not received at the client device within a threshold period of time.

15. The computer program product of claim 14, wherein the threshold period of time is set to a value that minimizes a latency of content being displayed at the client device in correspondence to the newly generated user input command.

16. The computer program product of claim 11, wherein the ring buffer is updated with another newly generated user input command that is placed at the end of the ring buffer and, in response to receiving the another newly generated user input command, a second ring buffer message corresponding to the updated ring buffer is sent to the remote server.

17. The computer program product of claim 16, wherein the second ring buffer message is sent to the remote server regardless of whether or not the first ring buffer message is received at the remote server.

18. The computer program product of claim 11, wherein the ring buffer has a size of N storage locations.

19. The computer program product of claim 18, wherein the newly generated user input command placed at the end of the ring buffer will have at least N chances to be recovered at the remote server.

20. The computer program product of claim 11, wherein the newly generated user input command and the one or more other previously generated user input commands each have a sequence identifier indicating a sequence order.

* * * * *